United States Patent [19]
Huang

[11] Patent Number: 5,704,281
[45] Date of Patent: Jan. 6, 1998

[54] WASHING CONTAINER

[76] Inventor: Huo-Tu Huang, No. 9, Lane 379, Chung-Hwa Road, Su-Lin, Taipei, Taiwan

[21] Appl. No.: 782,679

[22] Filed: Jan. 15, 1997

[51] Int. Cl.⁶ .......................... A47J 43/04; B01D 33/00; B08B 3/04; F26B 17/24
[52] U.S. Cl. .................. 99/536; 99/495; 99/511; 134/149; 134/157; 134/162; 210/380.1; 366/226; 366/234
[58] Field of Search .................. 99/495, 511–513, 99/516, 534, 536; 134/157, 158, 198, 200, 149, 162; 210/360.1, 380.1, 474, 477; 366/230, 234, 224–226

[56] References Cited

U.S. PATENT DOCUMENTS

| | | | |
|---|---|---|---|
| 2,881,776 | 4/1959 | Wrage | 134/162 |
| 4,096,873 | 6/1978 | Otzen | 134/135 |
| 4,548,221 | 10/1985 | Abrams | 134/141 |
| 5,064,535 | 11/1991 | Hsu | 210/380.1 |
| 5,184,544 | 2/1993 | Ling | 99/536 |

*Primary Examiner*—Timothy F. Simone
*Attorney, Agent, or Firm*—Bacon & Thomas

[57] ABSTRACT

A washing container using water and a rotatable brush for washing various granular food, and is especially applicable for medium and small size granular fruits. It is comprised of: a receiving barrel, a rotatable brush and an upper cover. Food is put in from a throw-in port and falls down in the receiving barrel filed with water, and the rotatable brush is rotated. The food to be cleaned is brushed and washed. Air containing ozone or ozone/anion is generated in a base of the receiving barrel and is injected into the receiving barrel to form bubbles to eliminate dirt and pesticide on the surfaces of the food, so as to keep the freshness of the food and to also clean the food.

13 Claims, 10 Drawing Sheets

WASHING CONTAINER

BACKGROUND OF THE INVENTION

1. Field of the Invention

The present invention relates to a washing container, having a receiving barrel, a rotatable brush and an upper cover. When food is put in from the throw-in port and falls down in the receiving barrel filled with water surrounding the rotatable brush, and the rotatable brush rotates, the food to be cleaned can be brushed and washed. This is favorable to washing of various granular food, and especially applicable for medium and small size granular fruits.

2. Description of the Prior Art

Most fruits need to be washed before eating, so as to avoid eating residual pesticide left on the fruit skins or eating other fine dirt and decayed bacteria injurious to human health.

Normally, medium size fruits such as apples, pears etc. will be washed cleaner due to their larger smooth skins and when they are flushed, the hands of the washer can contact most skins of them. They still need to be washed one by one though. When washing smaller fruits such as grapes, jujubes and cherries etc., because of the smaller volume and larger quantity thereof, quite a lot of time shall be taken if they are to be washed one by one, yet it is improbable to thoroughly clean them all. In view of this, most people place the small fruits into a receiving barrel, and pour water therein to stir the fruits with hands, and after that, they tip the water out. The fruits are not cleansed at all, and pesticide residue or bacteria in the fungi of the damaged fruit skins make the situation even worse.

In addition to these, other foods need to be washed before cooking, e.g., plants such as mushrooms, small tomatoes, seafood such as clams, shrimps etc. The problems stated above in regard to the inability to wash them clean or the necessity of wash them one by one by taking too much time still exists. Such problems are widely encountered in the kitchens of families or restaurants, and cookers have long been bothered by such problems.

SUMMARY OF THE INVENTION

The object of the present invention is to provide a washing tool for use by cookers to complete washing of various foods in an easy, quick and safer way, yet the foods can be cleaned more thoroughly. Users mostly place various food into a receiving barrel, and pour water therein to stir the food with hands, so that every piece of the food is washed by water. In this view, when the tool is used to stir, a hand grip is used to drive a rotatable axle structure for rotation stirring, or a motor is provided to drive the rotatable axle for rotation stirring.

However, the above stated stirring method cannot wash food clean. Another measure is necessary such as a fine brush to brush food for getting the cleansing effect. Since the skins of some of the food are flexible and are subjected to breaking, the brush material shall not be too stiff. When in washing by using of the tool and in the operation mode using the aforementioned rotatable axle for rotation stirring, a cylindrical brush washer is provided with fine, dense and soft brush down or brush strips to be driven by the rotatable axle for rotation, to form a rotating brush pivotally provided in the receiving barrel.

Using an ozone generator has been popularized, since ozone can kill bacteria and neutralize little residual pesticide. Therefore, it can render food not easily decayed to keep their freshness, or be not toxic. In the recent years, it has been effectively used in refrigerators, yet some clothes washing machines also have ozone for washing clothes to get rid of bacteria in the clothes.

Moreover, anions generated by an anion generator can absorb substances such as cations and dust etc. This is widely used in the household appliances such as air filters. When water is stirred with food, a great amount of air bubbles are formed during stirring. If anions are added in the bubbles, dust or dirt on the food can be carried away from the surfaces thereof by contact of the bubbles with the food. In view of this, when using a washing tool, a base including an ozone or an ozone/anion generator can be provided, so that cleansing of food will be faster, cleaner and more sanitary.

Therefore, the present invention is comprised at least of: a receiving barrel, a rotatable brush and an upper cover.

The receiving barrel is in a form of a tank for receiving therein clean water and articles to be washed. A protruding axle seat and a groove are provided on the upper surface of the bottom thereof. The groove extends externally to one lateral edge thereof to connect with a connecting pipe.

The rotatable brush is in a form of a cylinder, and is put on the axle seat with its periphery keeping a suitable distance from the inner rim of the receiving barrel. Fine and soft brush down or brush strips are uniformly provided thereon, and a driving portion is provided on the top central position thereof.

The upper cover covers the top of the receiving barrel, having a hand grip and a throw-in port provided on the top thereof. The hand grip can be rotated to drive a gear set and in turn to drive a rotatable axle which extends to the bottom of the upper cover to connect to the driving portion of the rotatable brush. The throw-in port is an access to the receiving barrel for the articles to be cleansed and for clean water.

By means of the above stated structure, when the space between the inner rim of the receiving barrel and the external periphery of the rotatable brush contains the articles to be cleansed and clean water, the hand grip can be rotated to turn the rotatable brush. Therefore, the clean water and the articles to be cleansed will inter-flow and move cross wise. Thus the brush down or brush strips on the surface of the rotatable brush can brush and wash the surfaces of the articles to be cleansed, and the cleansing effect can thus be achieved.

Additionally, the receiving barrel can be provided with a base on the bottom thereof, the base being provided with an ozone or an ozone/anion generator which is connected to an air pipe. A connector is provided on the end of the air pipe and is connected to a connecting pipe provided at the bottom of the receiving barrel. The connecting pipe extends into a groove. When cleansing, air carrying ozone or ozone/anion generated in the base is injected through the connector into the receiving barrel to generate air bubbles, so that when the articles to be cleansed are brushed and washed by water and the rotatable-brush, they are treated by the ozone and anions. The residual pesticide, impurities and bacteria on the surfaces thereof are quickly cleaned.

The present invention will be apparent in its technical characteristics after reading the detailed description of the preferred embodiments thereof in reference to the accompanying drawings.

BRIEF DESCRIPTION OF THE DRAWINGS

In the drawings:

FIG. 9A is a perspective view of an air ventilation sheet shown in FIG. 9.

FIG. 9B is a perspective view of the air ventilation sheet of FIG. 9A.

FIG. 9C is a cross-sectional view of the air ventilation sheet of FIGS. 9A and 9B.

FIG. 10A is an enlarged view of area B is FIG. 10.

DETAILED DESCRIPTION OF THE PREFERRED EMBODIMENTS

Figure 1:
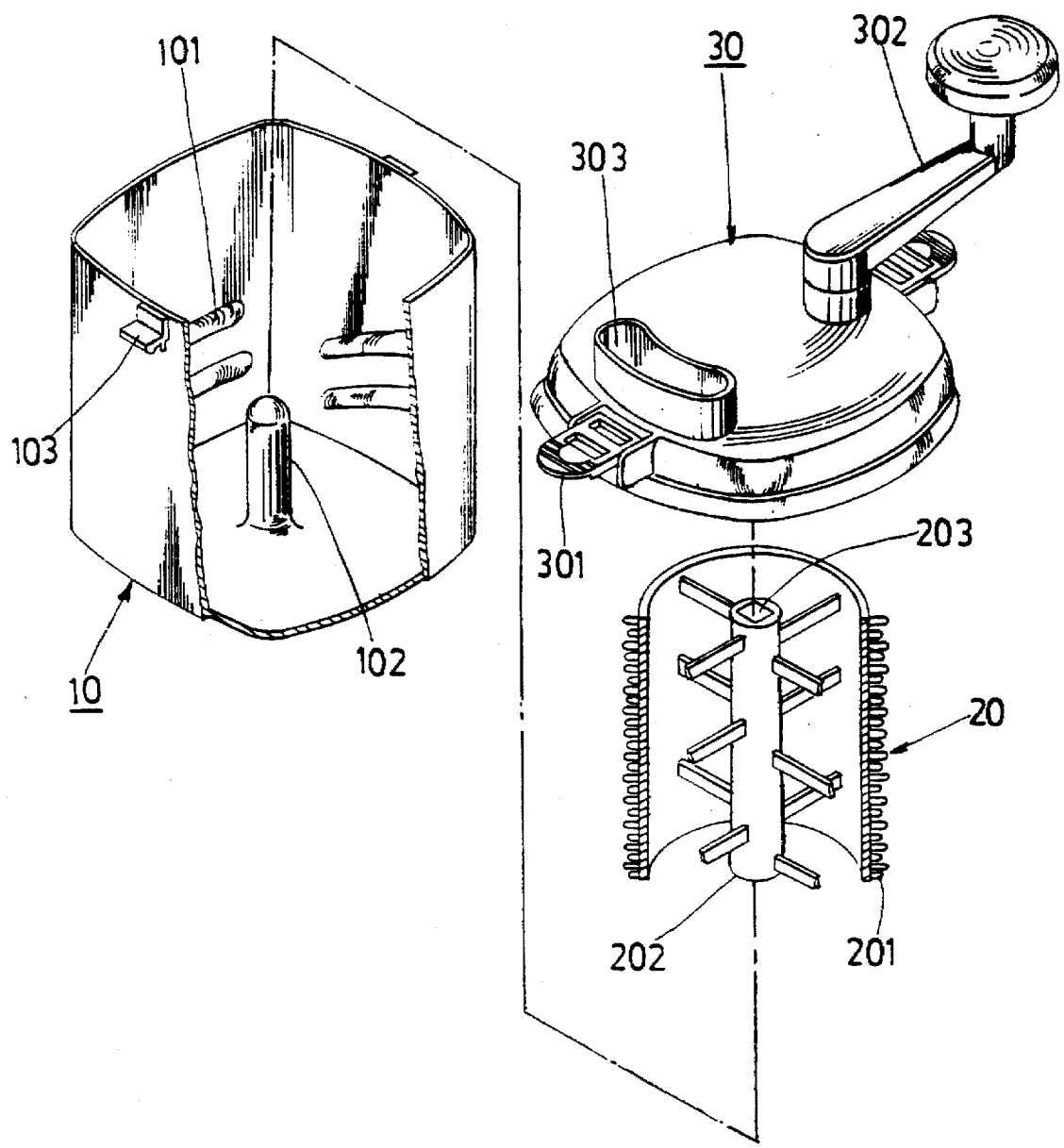
FIG. 1 is an exploded perspective view of the members composing the present invention.

Referring to FIG. 1, the washing container of the present invention is comprised of: a receiving barrel 10, a rotatable brush 20 and an upper cover 30. wherein: the receiving barrel 10 is in the form of a tank for receiving therein clean water and articles to be washed, a plurality of flow disturbance plates 101 are provided surroundingly therewithin, a protruding axle seat 102 is provided on the upper surface of the bottom thereof, and two locking hooks 103 are provided on the external upper surface thereof.

The rotatable brush 20 is in a form of a cylinder, and is placed in the receiving barrel 10. Fine and soft brush down or brush strips 201 are uniformly provided on the external surface thereof, and an axle sleeve 202 is provided at the center position thereof. The bottom end of the axle sleeve 202 can be fitted over the axle seat 102 provided on the upper surface of the bottom of the receiving barrel 10, and a driving portion 203 is provided on the top of the axle sleeve 202.

The upper cover 30 covers the top of the receiving barrel 10, a locking member 301 is provided correspondingly for each of the above mentioned locking hooks 103, a hand grip 302 and a throw-in port 303 are provided on the top of the upper cover 30.

Figure 2:
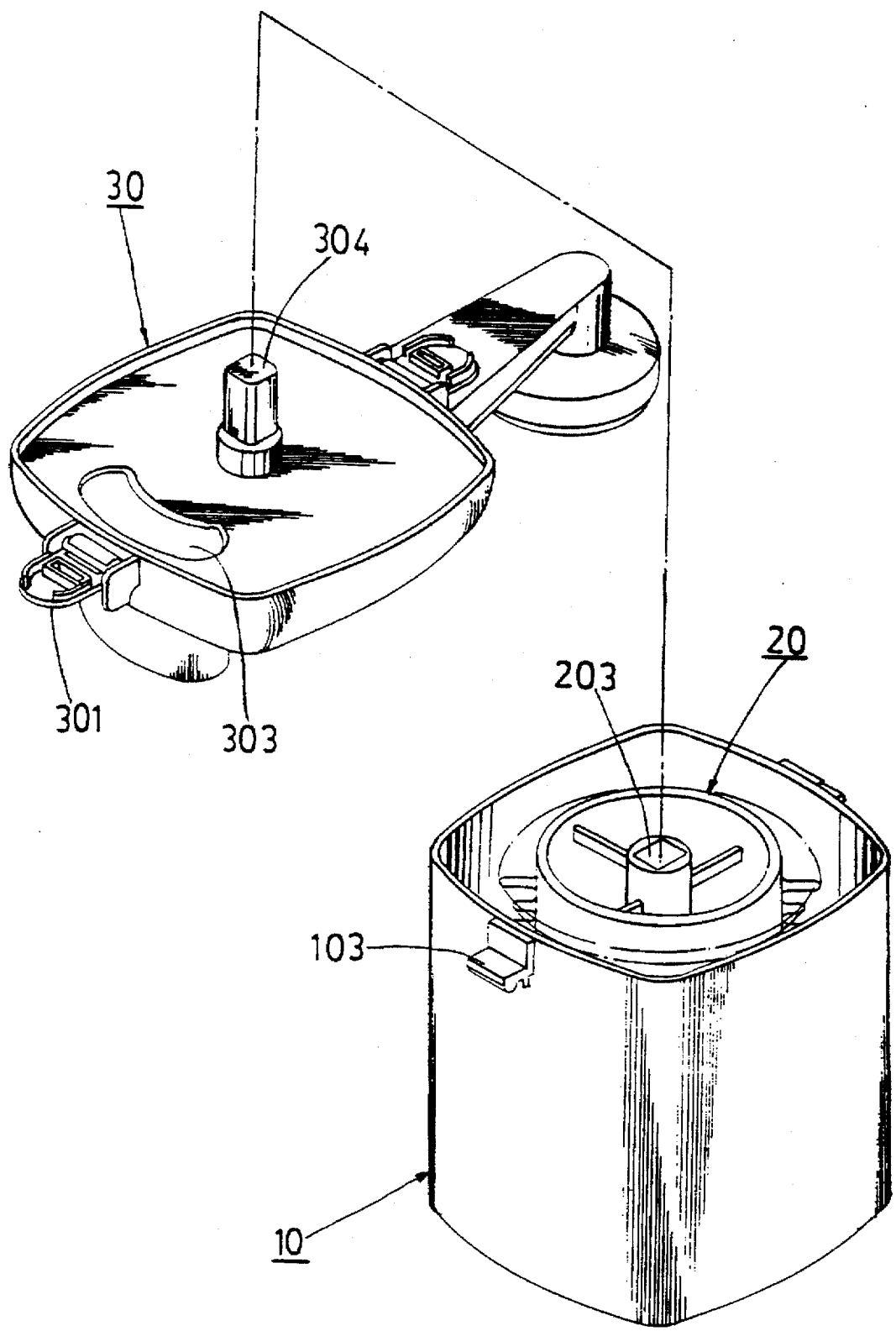
FIG. 2 is a perspective view showing assembling of the receiving barrel and the rotatable brush of the present invention is completed, while the upper cover therein is turned over.

Please refer to FIG. 2. The above mentioned rotatable brush 20 is placed in the receiving barrel 10 with its external periphery keeping a suitable distance from the inner rim of the receiving barrel 10. The upper cover 30 can be closed over by engagement of the locking members 301 with the locking hooks 103 provided on the receiving barrel 10, so that the upper cover 30 covers the top of the receiving barrel 10. The throw-in port 303 on the upper cover 30 extends from the top through the bottom of the upper cover 30, and is located exactly above a position between the inner rim of the receiving barrel 10 and the external periphery of the rotatable brush 20. The bottom of the upper cover 30 is provided with a protruding rotating axle 304 mating with the driving portion 203 provided on the top of the axle sleeve 202, such that the rotating axle 304 can be inserted into the driving portion 203.

Figure 3:
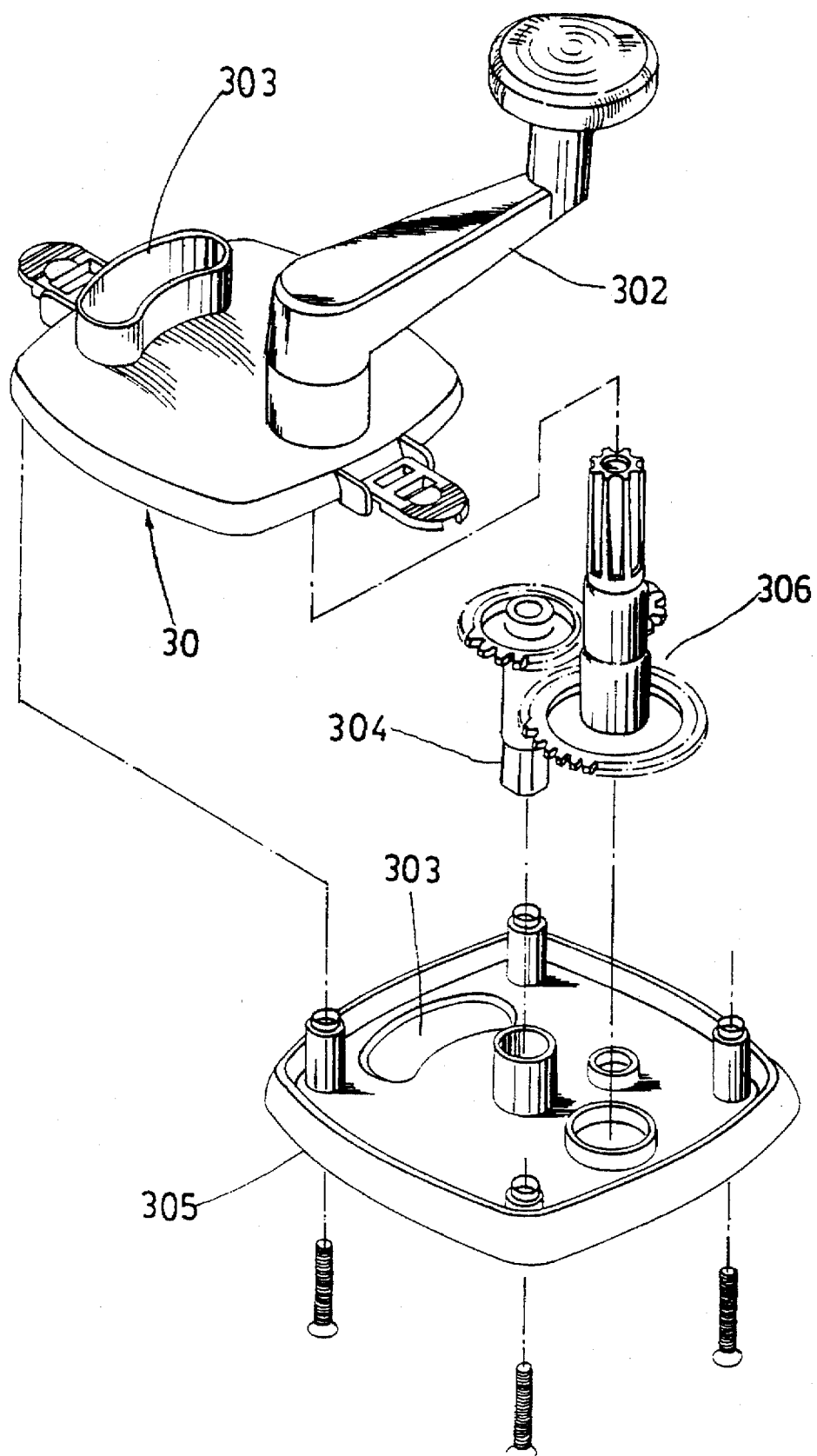
FIG. 3 is an exploded perspective view of the upper cover of the present invention.

Please refer to FIG. 3. The above mentioned upper cover 30 is provided at the bottom thereof with a bottom plate 305 to form a space between the body of the upper cover 30 and the bottom plate 305, to accommodate a driving gear set 306. The hand grip 302 provided on the top of the upper cover 30 is engaged on the bottom thereof with the driving gear set 306, so that when the hand grip 302 is rotated, by driving of the driving gear set 306, the rotating axle 304 can be rotated.

Figure 4:
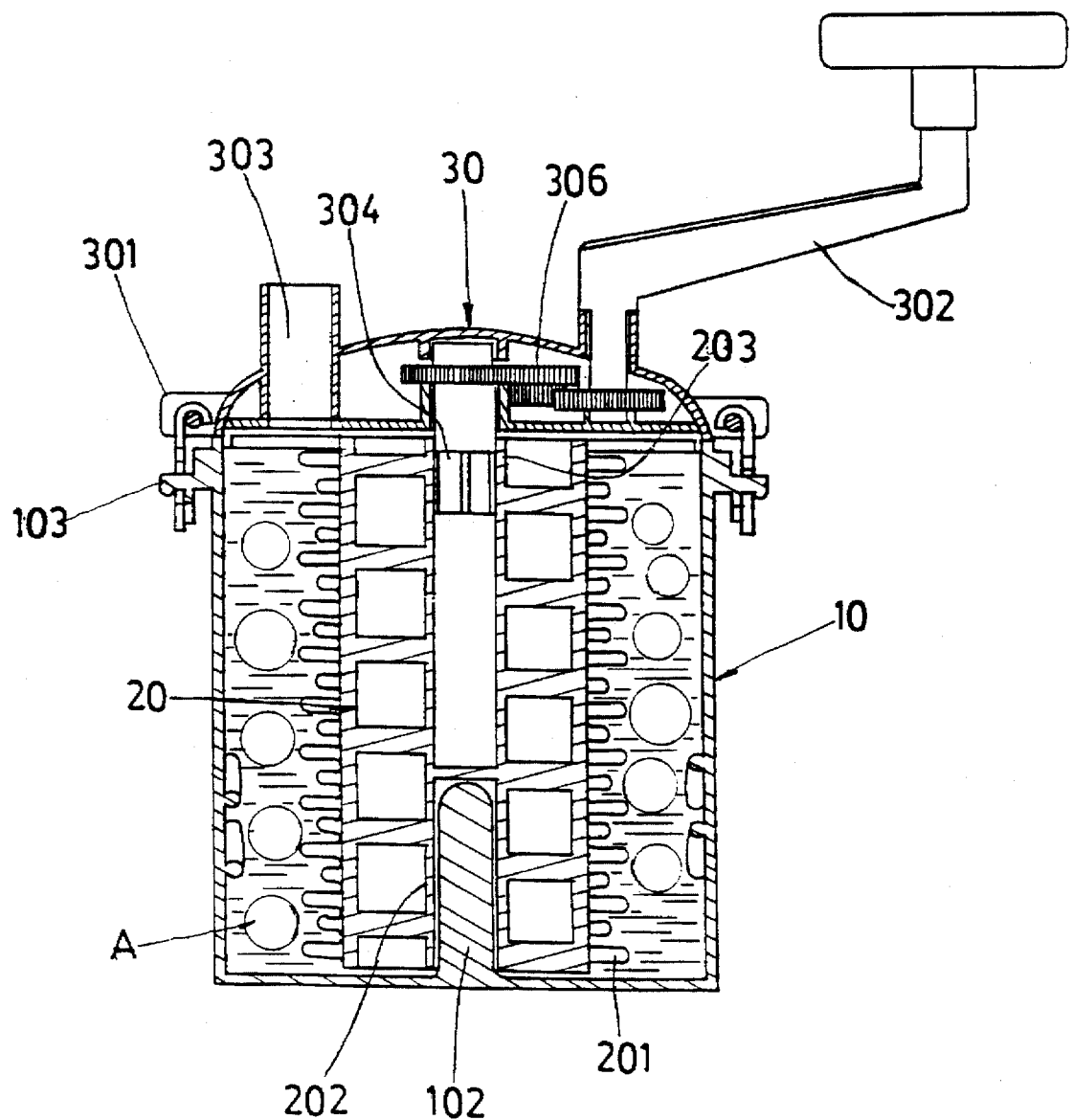
FIG. 4 is a sectional view showing the present invention completed for use.

Please refer to FIG. 4. In completion of assembling of the washing container of the present invention, the protruding axle seat 102 provided on the upper surface of the bottom of the receiving barrel 10 is rotatably connected to the bottom of the axle sleeve 202 at the center of the rotatable brush 20, while the driving portion 203 provided on the top of the axle sleeve 202 is engaged with the rotating axle 304 provided on the bottom of the upper cover 30. The upper cover 30 is fixedly locked by the locking members 301 onto the locking hooks 103 provided on the receiving barrel 10, while the throw-in port 303 is located above a position between the inner rim of the receiving barrel 10 and the external periphery of the rotatable brush 20. When a user holds the hand grip 302 and rotates same, the driving gear set 306 will be driven, and the rotatable brush 20 will be rotated by the action of the driving gear set 306 driving the rotating axle 304 which in turn drives the driving portion 203.

By means of the above structure, when the user places a plurality of articles "A" to be washed and clean water into the space between the inner rim of the receiving barrel 10 and the rotatable brush 20, the rotation of hand grip 302 can turn the rotatable brush 20. By displacement of the brush down or brush strips 201 provided on the rotatable brush 20 and by disturbance of the flow disturbance plates 101 provided on the inner wall of the receiving barrel 10, the articles "A" to be washed in water can be floated and flow, so that the articles "A" can avoid precipitating on the bottom of the receiving barrel 10. While the brush down or brush strips 201 can thoroughly brush the surfaces of the articles "A" to be washed, the articles "A" can thus be ready for use, and the effect of cleansing can be achieved. Moreover, when in brushing and washing, salt can be added through the throw-in port 303 to treat the articles "A" to be washed even cleaner.

Figure 5:
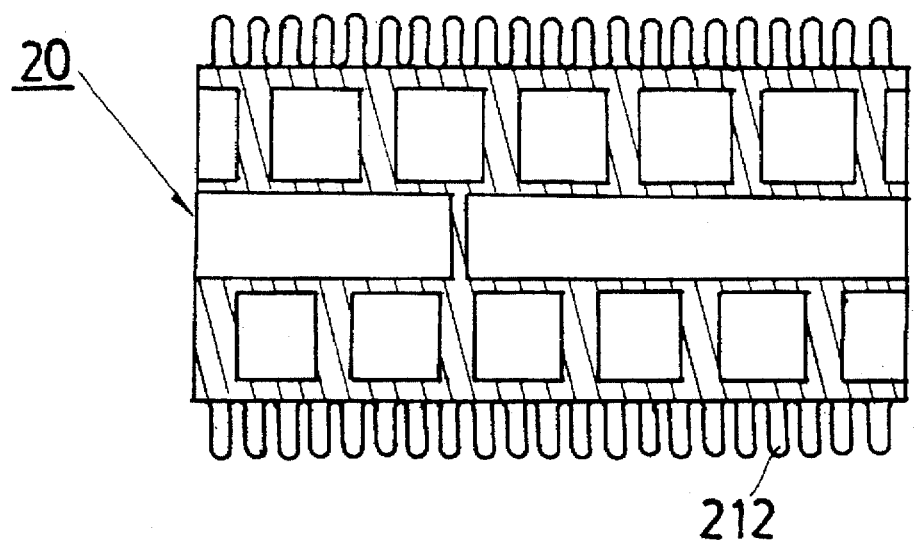
FIG. 5 is a sectional view showing the second embodiment of the rotatable brush of the present invention.
Figure 6:
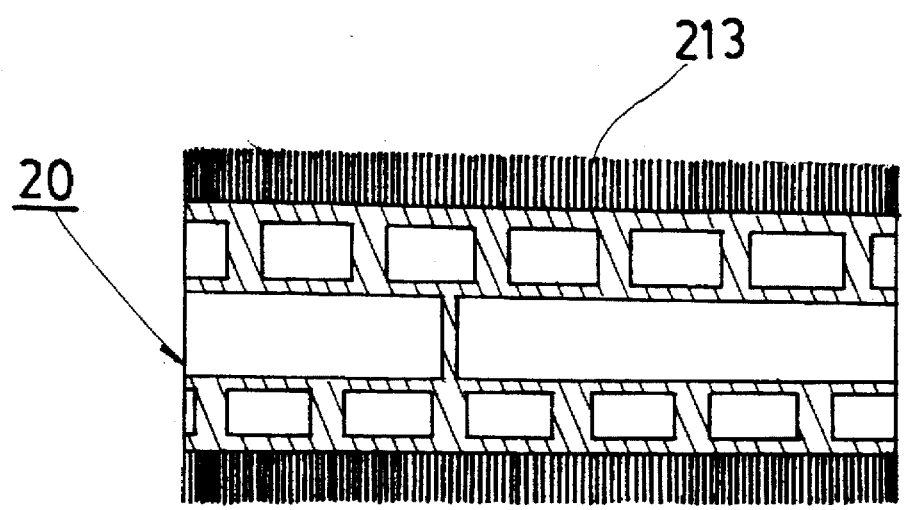
FIG. 6 is a sectional view showing the third embodiment of the rotatable brush of the present invention.

Referring to FIGS. 4, 5 and 6, the brush down or brush strips 201 provided on the external periphery of the rotatable brush 20, are as shown in FIG. 4, in which coarser and longer brush strips 201 are used and arranged alternately. Also as shown in FIG. 5, brush strips 212 can be formed all in equal length, or as shown in FIG. 6, softer and finer brush down 213 can be used. Providing and arranging of the brush down 213 can also be of equal length or alternatively long and short down, so that when washing of the articles "A", the rotatable brush 20 can be chosen according to softness of the surfaces of, or size of granules of the articles "A". The external diameter of the rotatable brush 20 can be variable in accordance with the sizes of the articles "A" to be washed.

Figure 7:
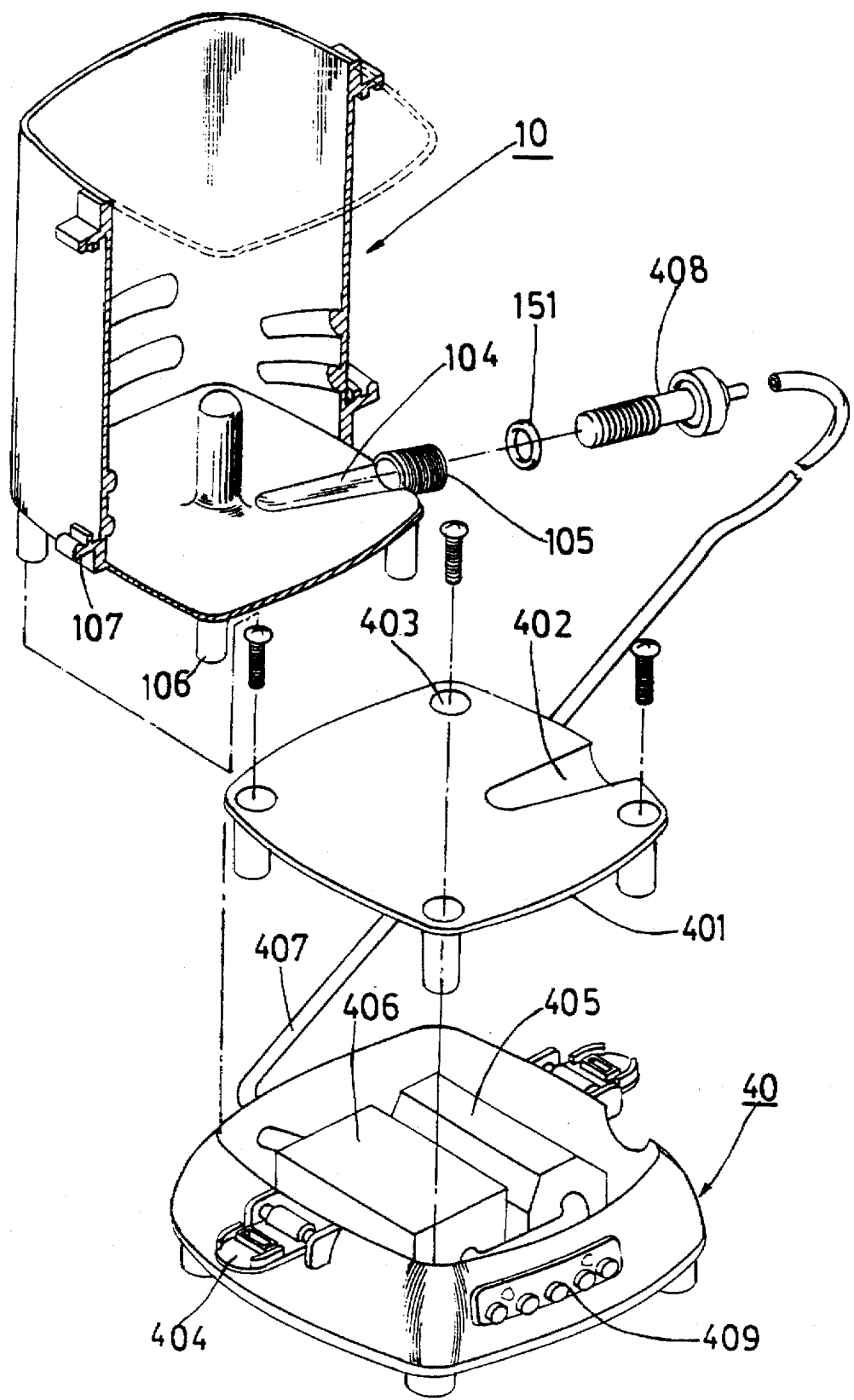
FIG. 7 is an exploded perspective view showing the present invention with a base having an ozone or ozone/anion generator therein.

Referring to FIG. 7, a base 40 can be provided, with the receiving barrel 10 placed on the top of the base 40. The base 40 can generate bubbles containing ozone or ozone/anion to be injected into the receiving barrel 10. Ozone can kill bacteria and neutralize little residual pesticide and anions can carry impurities such as dust etc. away from the surfaces of the articles to be washed. Thus, articles "A" to be washed can be cleansed much cleaner. In this embodiment, the upper surface of the bottom of the receiving barrel 10 is further excavated downward to form a groove 104 which extends externally to connect with a connecting pipe 105. The bottom of the receiving barrel 10 is further extended downward to form a plurality of legs 106, and two locking hooks 107 which are provided on the external lower surface thereof. The above mentioned base 40 is provided with a seating surface 401 on the top thereof for placing the receiving barrel 10, the seating surface 401 is provided on the top thereof with a recessed portion 402 corresponding to the groove 104 of the receiving barrel 10 and with a plurality of positioning holes 403 corresponding to the legs 106. The base 40 is provided with locking members 404 on two mutually opposed top edges thereof corresponding to the locking hooks 107. An air drawing pump 405 and an ozone or an ozone/anion generator 406 are further provided beneath the seating surface 401 in the interior of the base 40. The ozone or the ozone/anion generator 406 is connected to an outwardly extending air pipe 407 of which an end is provided with an air bubble connector 408. The air bubble connector 408 can be placed into the connecting pipe 105 provided at the bottom of the receiving barrel 10 to thereby extend into the groove 104. The base 40 is provided on one external lateral surface thereof with a plurality of control keys 409 which can control activation, operating time and switching of the ozone or the ozone/anion generator 406 to generate ozone or anion or ozone/anion into the air pipe 407.

Figure 8:
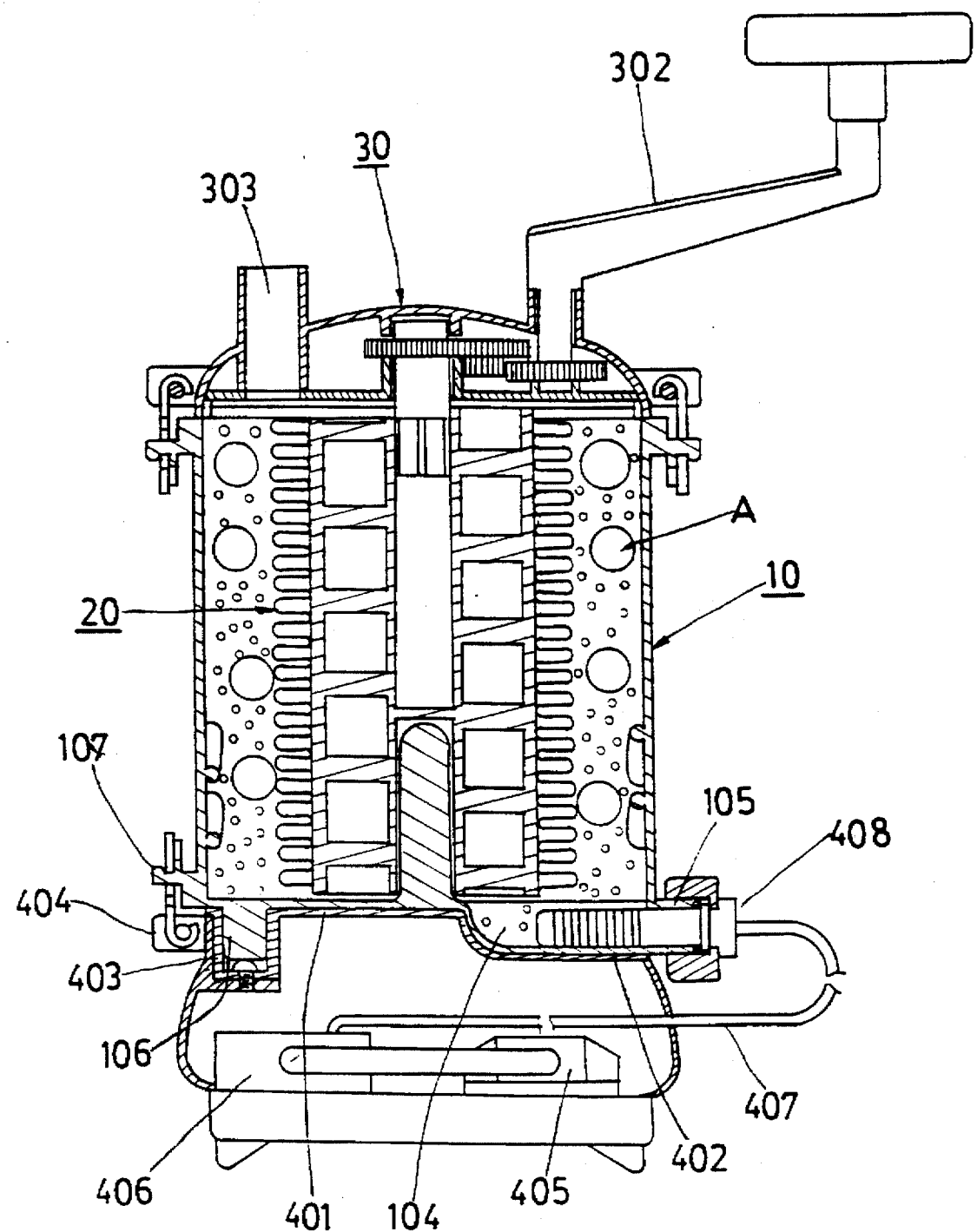
FIG. 8 is a sectional view showing the present invention is assembled with the base having an ozone or ozone/anion generator therein.
Figure 9:
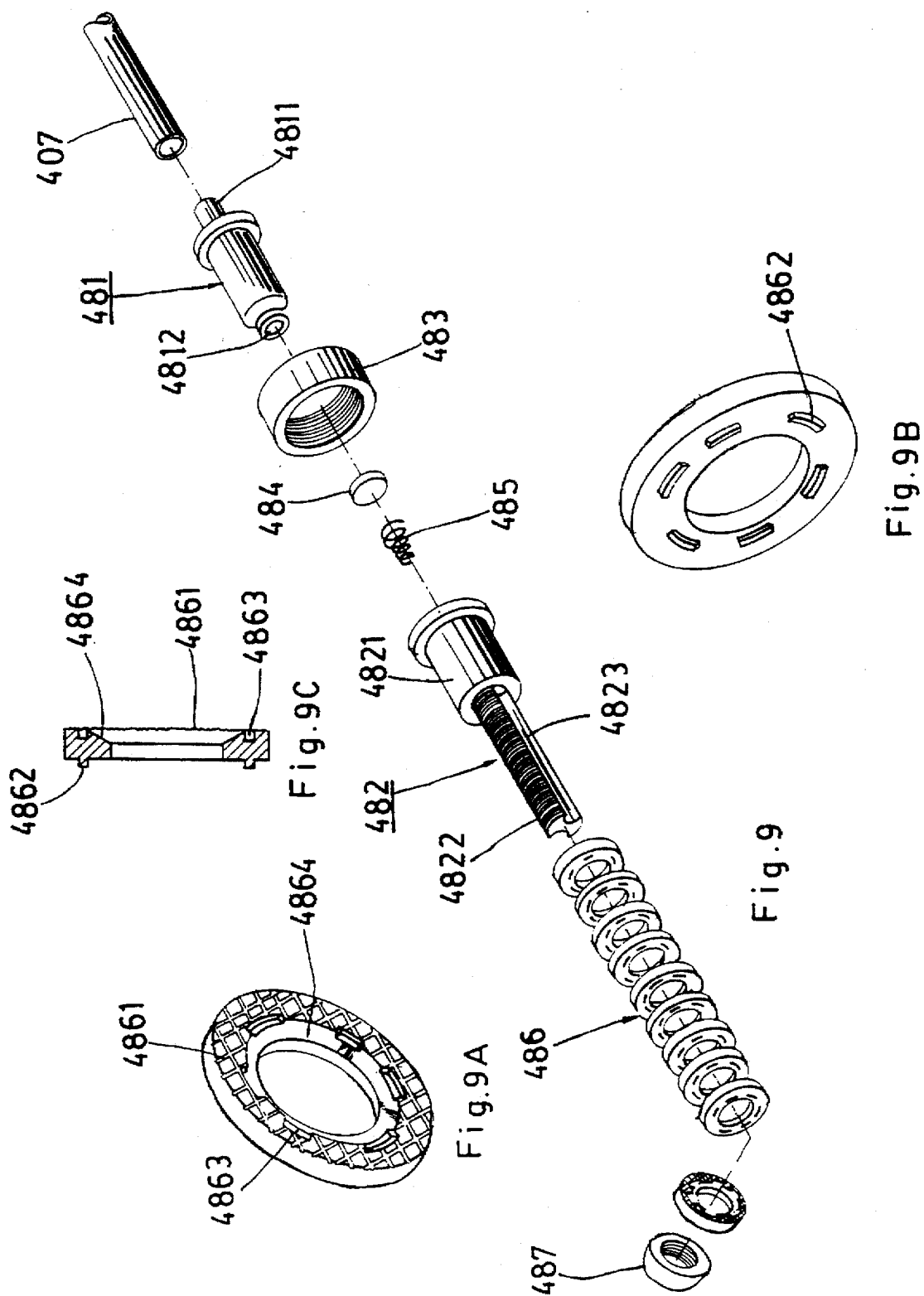
FIG. 9 is an exploded perspective view showing a bubble connector of the present invention.

Referring to FIG. 8, when the receiving barrel 10 and the base 40 are combined together, the bottom of the receiving barrel 10 is superimposed on the top of the seating surface 401, and is fixed by engagement of the legs 106 in the positioning holes 403, the groove 104 in the recessed portion 402, and the locking members 404 in the locking hooks 107. The bubble connector 408 is inserted into the connecting pipe 105 provided at the bottom of the receiving barrel 10 to thereby extend in the groove 104 provided at the bottom of the receiving barrel 10, so that when clean water is' stored in the receiving barrel 10, the air bubble connector 408 is dipped in water. Thus, assembly of the receiving barrel 10 and the base 40 is completed.

In use, the articles "A" to be washed and clean water are placed into the space between the inner rim of the receiving barrel 10 and the rotatable brush 20 via the throw-in port 303 of the upper cover 30, and the rotated hand grip 302 on the receiving barrel 10 rotates the rotatable brush 20 to brush the articles "A" to be washed. By the function of the air drawing pump 405 and the ozone or ozone/anion generator 406 in the base 40 activated by the control keys 409 (FIG. 7), the ozone or ozone/anion generator 406 will produce air containing ozone or ozone/anion through the air pipe 407 to the air bubble, connector 408 which can generate in the groove 104 provided at the bottom of the receiving barrel 10 bubbles and mix the air into water. When the articles "A" to be washed are brushed by the rotatable brush 20, residual pesticide, dust and bacteria can be eliminated by the bubbles containing ozone or ozone/anion, and therefore, the articles "A" to be washed can be cleansed very quickly and conveniently.

Referring to FIGS. 9, 9A, 9B and 9C when the air bubble connector 408 is dipped in water, the air put out therefrom will form a large number of extremely small bubbles. As is shown in the drawing, the air bubble connector 408 is comprised of a connecting head 481, an air outlet 482, a connecting member 483, a stop member 484, an elastic element 485, a plurality of air ventilation sheets 486, and a cap 487.

The connecting head 481 is provided on the front end thereof with a connecting pipe 4811 which is telescopically inserted in the above mentioned air pipe 407, and is provided in the center thereof with a throughhole 4812 which extends through the connecting head 481.

The air outer 482 is provided on the front end thereof with a sleeve connector 4821 fitting over the end of the connecting head 481, the end of the sleeve connector 4821 is provided with a screw 4822 extending rearwardly therefrom. Both sides of the screw 4822 are recessed to form grooves 4823 which communicate with the interior of the sleeve connector 4821.

The connecting member 483 is in a form of hollow ring, the front end thereof slips over the connecting head 481, while the inner periphery thereof is kept an adequate distance from the sleeve connector 4821 of the air outlet 482.

The stop member 484 and the elastic element 485 are provided in the sleeve connector 4821. The stop member 484 is located behind the connecting head 481, while the elastic element 485 is located behind the stop member 484.

The air ventilation sheets 486 are fitted over the screw 4822 and lapped over one by one, having knurls 4861 on the lateral sides thereof (as shown in FIG. 9A, 9B and 9C), and each with engaging protrusions 4862 on one side and corresponding engaging grooves 4863 on the other side thereof, so that the air ventilation sheets 486 can be engaged with one another. The air ventilation sheets 486 are each provided on the inner periphery thereof, which fits over the screw 4822, with a sloped surface 4864.

The cap 487 covers the end of the screw 4822, while the front end thereof abuts against the last air ventilation sheet 486, so that the grooves 4823 on both sides of the screw 4822 are sealed.

Figure 10:
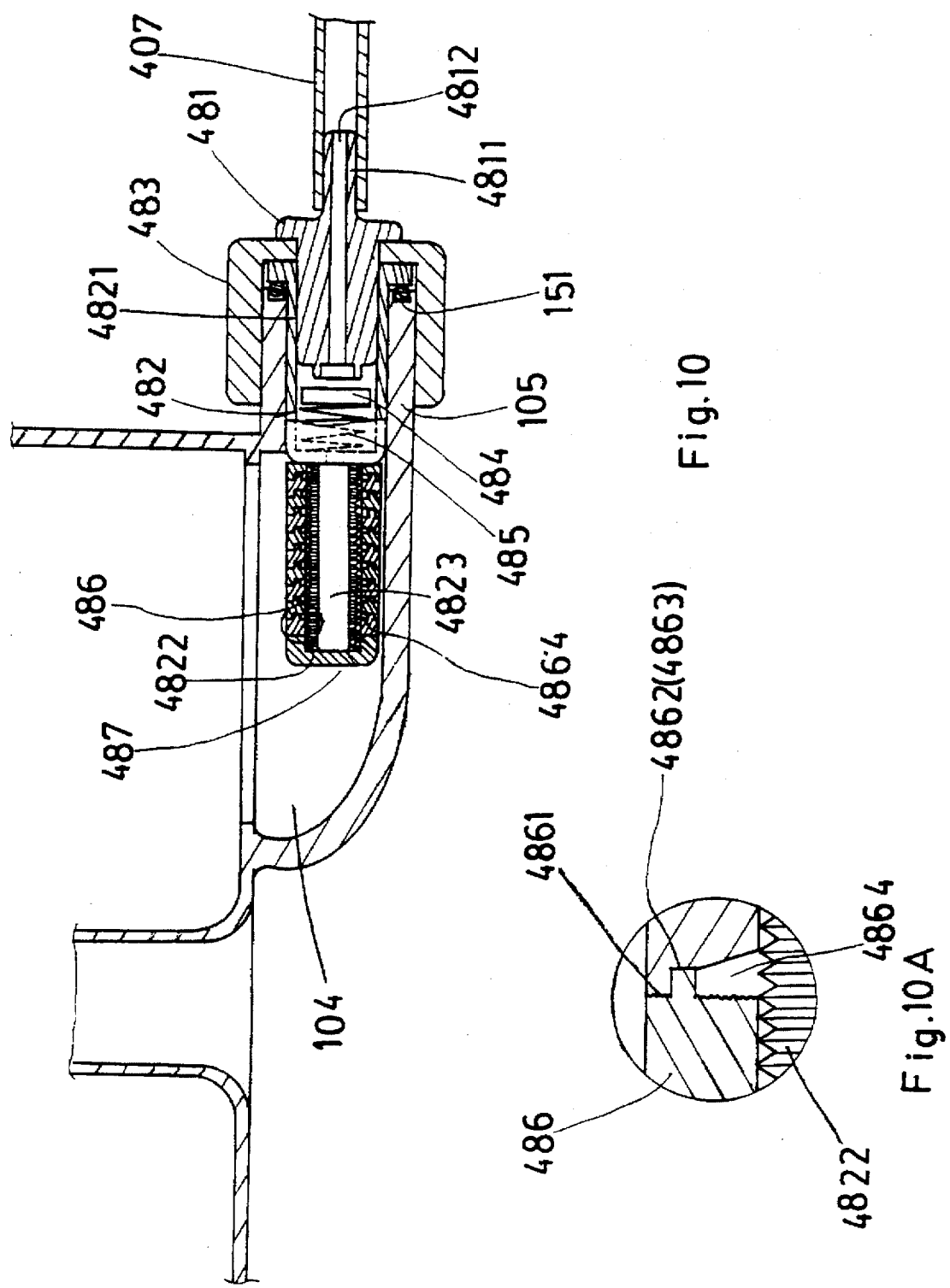
FIG. 10 is a sectional view showing the bubble connector of the present invention provided on the bottom of the receiving barrel.

Referring to FIG. 10, by means of the above stated structure, when the air bubble connector 408 and the connecting pipe 105 are connected with each other, the air outlet 482 is placed into the connecting pipe 105 provided on the front end thereof with a rubber gasket 151. The connecting pipe 105 thus is placed in the gap between the wall of the air outlet 482 and the connecting member 483. The inner wall of the connecting member 483 is screw connected tightly with the external wall of the connecting pipe 105, the rubber gasket 151 on the front end of the connecting pipe 105 is used for preventing water from water leaking. The end of the air outlet 482 extends into the groove 104 on the bottom of the receiving barrel 10. When air in the air pipe 407 is injected from the connecting pipe 4811 of the connecting head 481, air passing through the throughhole 4812 can open the stop member 484 at the end of the throughhole 4812 to compress the elastic element 485, so that the air can get into the sleeve connector 4821 of the air outlet 482 and then out of the grooves 4823 on both sides of the screw 4822 at the end of the air outlet 482. Due to the fact that the end of the grooves 4823 are sealed by the cap 487, air can only get out of the grooves 4823 through the gaps formed in the upper screw portion of the screw 4822 (FIG. 10 A) and at the sloped surfaces 4864 provided at the connection of the inner periphery of the air ventilation sheets 486 and the screw 4822. Air can be uniformly distributed at the inner periphery due to the sloped surfaces 4864 circling around the periphery of the air ventilation sheets 486. Air escapes out of the air ventilation sheets 486 through the knurls 4861 on the lateral sides of the air ventilation sheets 486. Because the air outlet 482 and the air ventilation sheets 486 fitted over it are extended into the groove 104 on the receiving barrel 10 and are thereby dipped in water, air emitting out of them forms in the water extremely small bubbles to help the aforementioned cleansing. When the air pipe 407 is stopped supplying air, the elastic element 485 can abut against the stop member 484 by elasticity to cause the stop member 484 to seal the end of the throughhole 4812 and thus prevent air in the air outlet 482 from flowing in a contrary direction.

Figure 11:
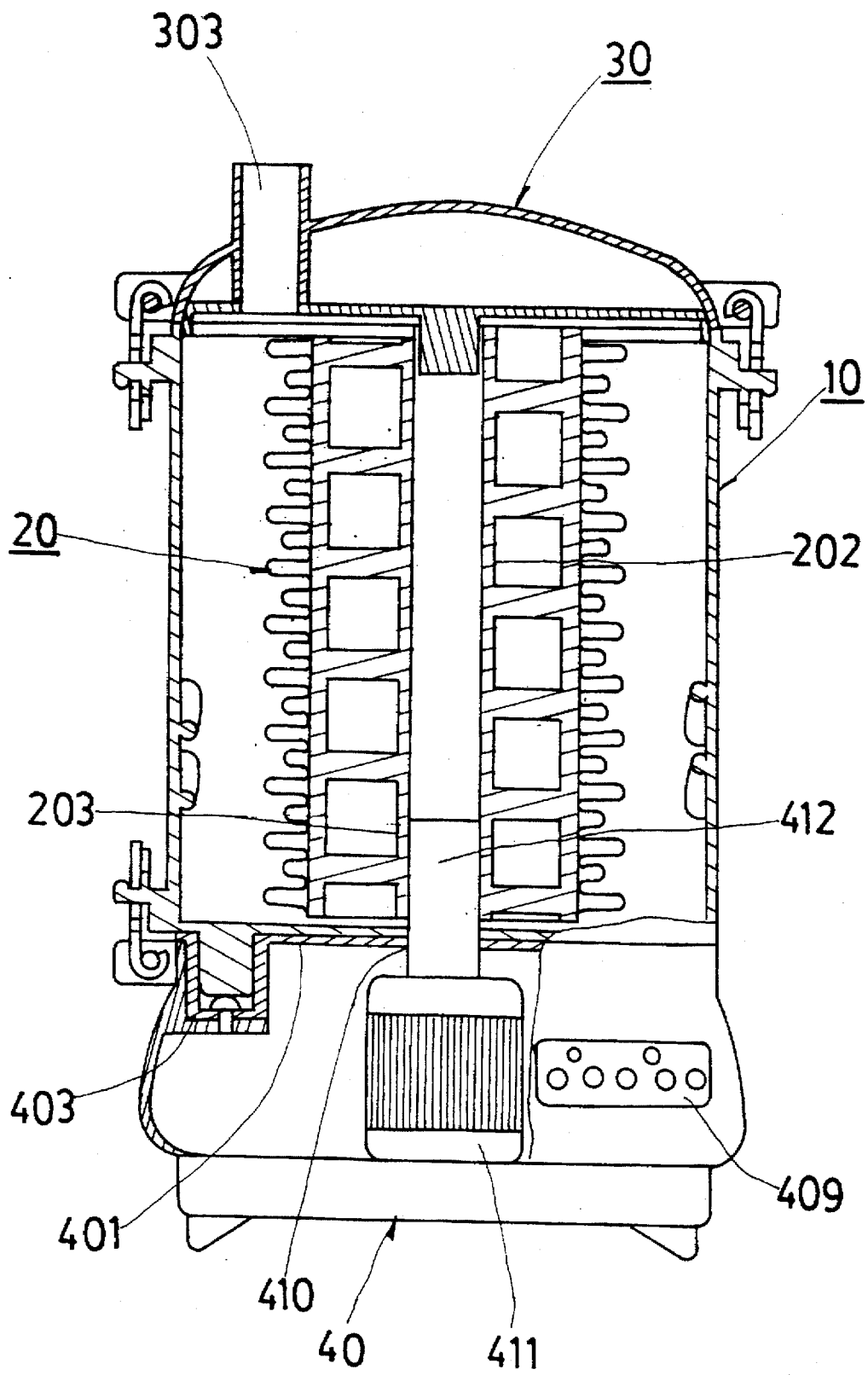
FIG. 11 is a sectional view showing the present invention used with a base having a rotatable brush driven by a motor.

Please refer to FIG. 11. The above mentioned base 40 is not limited to that of generating air bubbles having ozone or ozone/anion. The top of the base 40 is provided with the seating surface 401 which is provided with, in addition to the positioning holes 403, an axle hole 410 at the center position thereof. The base 40 is provided therein with a motor 411 under the seating surface 401, such that the driving axle 412 of the motor 411 extends out of an axle hole 410 and thus is exposed to the upper side of the seating surface 401. Activation, turning off and duration of activation of the motor 411 can be controlled by the control keys 409 provided on one external lateral surface of the base 40. The receiving barrel 10 in this embodiment has the driving portion 203 of the axle sleeve 202 provided on the bottom thereof to connect with the driving axle 412. The upper cover 30 in this embodiment is provided only with the throw-in port 303 on the top thereof. When the control keys 409 activate the motor 411 to drive rotatably the driving axle 412 which in turn drives the rotatable brush 20 to brush the articles "A" to be washed, so that function of automatic washing can be achieved.

Names for the elements are used in the above specification only for description of the structure of the present invention. It will be apparent to those skilled in this art that various modifications or substitutions can be made to the present apparatus without departing from the spirit and scope of this invention. Accordingly, all such modifications and substitutions also fall within the scope of the appended claims and are intended to form part of this invention.

I claim:

1. A washing container, comprising
   a receiving barrel for receiving therein clean water and articles to be washed, the receiving barrel having a protruding axle seat centrally provided on an upper surface of a bottom thereof;
   a cylindrical rotatable brush in said receiving barrel and rotatably located on said axle seat with it periphery spaced from an inner rim of said receiving barrel, brush elements uniformly provided on an external surface of the brush, the brush having an axle sleeve at it center thereof, and a driving portion on a top of said axle sleeve;
   an upper cover removably attached to a top of said receiving barrel, having a throw-in port being on a top thereof; and,
   a driving mechanism engaging the driving portion of said axle sleeve of said rotatable brush to rotate the brush, said throw-in port being configured to accept clean water and articles to be washed which are then put into the space between the inner wall of said receiving barrel and the external surface of said rotatable brush, such that rotation of said rotatable brush causes the articles to be washed.

2. The washing container as claimed in claim 1, further comprising
   a base removably supporting said receiving barrel, said base provided with at least one of an ozone generator and an ozone/anion generator, and an air pump, said at least one of ozone generator and ozone/anion generator connected to an air pipe of which an end is provided with an air bubble connector, said air bubble connector located in a connecting pipe provided at the bottom of said receiving barrel whereby said air drawing pump draws air into said at least one ozone generator and ozone/anion generator to put out air containing ozone or ozone/anion through said air pipe into said air bubble connector to generate bubbles in said receiving barrel to eliminate injurious substance and bacteria on the surfaces of the articles being washed.

3. The washing container as claimed in claim 1, further comprising:
   a base supporting said receiving barrel, wherein the driving mechanism comprises a motor located in the base with a driving axle extending into said receiving barrel;
   said driving portion of said rotatable brush is fitted over said driving axle, such that said rotatable brush is rotated by rotation of said driving axle of said motor.

4. The washing container as claimed in claim 1, further comprising:
   a plurality of locking members on said upper cover engageable with a plurality of locking hooks provided on said receiving barrel.

5. The washing container as claimed in claim 11, wherein:
   said upper cover comprises a body and bottom plate on the bottom thereof said bottom plate spaced from the body to form a space between the body and said bottom plate, wherein the driving gear set is located in said space and engaged with said hand grip and said rotating axle, such that when said hand grip is rotated, said rotating axle is rotated.

6. The washing container as claimed in claim 1, further comprising:
   a plurality of flow disturbance plates provided on said receiving barrel extending into the space between the brush and the barrel such that, when said rotatable brush is rotated, said flow disturbance plates create flow disturbances in the water in said receiving barrel, to prevent the articles to be washed from-precipitation on the bottom surface of the receiving barrel.

7. The washing container as claimed in claim 1, wherein:
   said brush elements provided on the external periphery of said rotatable brush all have substantially equal length.

8. The washing container as claimed in claim 2, wherein:
   said base is provided on the top thereof with a plurality of positioning holes, and further comprising a plurality of legs extending bottom of said receiving barrel and into said positioning holes; and a plurality of control keys are further provided on an external lateral surface of said base.

9. The washing container as claimed in claim 2 wherein said air bubble connector comprises:
   a connecting head with a connecting pipe telescopically inserted in the air pipe, and having a center throughhole which extends through said connecting head;
   an air outlet having a sleeve connector fitting over said connecting head, said sleeve connector being provided with a screw extending therefrom, with sides of said screw being recessed to form grooves communicating with an interior of said sleeve connector;
   a generally annular connecting member located over said connecting head, with an inner periphery thereof spaced from said sleeve connector of said air outlet;
   a stop member provided in said sleeve connector and located behind said connecting head;

an elastic element bearing against said sleeve connector and said stop member;

a plurality of air ventilation sheets fitted over said screw and lapped over one by one, adjacent to each other, each air ventilation sheet having a knurled surface on a lateral side engaging protrusions extending from a second lateral side and corresponding engaging grooves on the first lateral side, so that said air ventilation sheets are engaged with one another, said air ventilation sheets each having a sloped surface on an inner periphery thereof, which fits over the screw;

a cap attached to and covering an end of said screw, and abutting against one of said air ventilation sheets, so that said grooves on both sides of said screw are sealed;

whereby, said air outlet is placed into said connecting pipe, said connecting pipe is placed between a wall of said air outlet and said connecting member, said connecting member is screw connected tightly with an external wall of said connecting pipe, the end of said air outlet, said air ventilation sheets and said cap are located in said receiving barrel in water when said receiving barrel is filled with water such that when air is passed through said air pipe, air passing through said throughhole of said connecting head opens said stop member enabling air to flow into said air outlet, and the grooves between said screw and said ventilation sheets and, by means of said sloped surfaces of said air ventilation sheets, air is uniformly distributes at the inner periphery thereof; and by means of said knurled surfaces on the lateral sides of said air ventilation sheets, the air emitting out of them forms in the water in said receiving barrel a plurality of bubbles; and when said air supply is stopped said elastic element urges said stop member to seal the end of said throughhole and thus prevent air from flowing out in a contrary direction.

10. The washing container as claimed in claim 1 wherein the driving mechanism comprises:

a hand grip rotatably located on said upper cover and connected to a driving gear set; and, a rotating axle connected to the driving gear set and extending from the upper cover to engage the driving portion of said axle sleeve of said brush with the rotation of the hand grip causes rotation of the brush.

11. The washing container as claimed in claim 1 wherein said brush elements have short and long lengths which alternate in a longitudinal direction along the length of the brush.

12. The washing container as claimed in claim 1 wherein said brush elements comprise brush strips.

13. The washing container as claimed in claim 1 wherein said brush elements comprise brush down.

* * * * *